(12) United States Patent
Matsuda et al.

(10) Patent No.: US 8,009,408 B2
(45) Date of Patent: Aug. 30, 2011

(54) LAMINATED CERAMIC CAPACITOR

(75) Inventors: Makoto Matsuda, Moriyama (JP);
Tomoyuki Nakamura, Moriyama (JP)

(73) Assignee: Murata Manufacturing Co., Ltd., Kyoto-Fu (JP)

( * ) Notice: Subject to any disclaimer, the term of this patent is extended or adjusted under 35 U.S.C. 154(b) by 0 days.

(21) Appl. No.: 12/907,207

(22) Filed: Oct. 19, 2010

(65) Prior Publication Data

US 2011/0038097 A1 Feb. 17, 2011

Related U.S. Application Data

(63) Continuation of application No. PCT/JP2009/003460, filed on Jul. 23, 2009.

(30) Foreign Application Priority Data

Jul. 29, 2008 (JP) ................................. 2008-195201

(51) Int. Cl.
*H01G 4/06* (2006.01)

(52) U.S. Cl. .................. 361/321.4; 361/308.1; 361/311; 361/313; 361/321.1; 361/321.2

(58) Field of Classification Search ............... 361/321.4, 361/301.1, 301.4, 308.1, 311–313, 321.1, 361/321.2, 306.1, 306.3; 501/134–135, 138–139
See application file for complete search history.

(56) References Cited

U.S. PATENT DOCUMENTS

| | | | |
|---|---|---|---|
| 6,058,005 A * | 5/2000 | Matoba et al. | 361/321.4 |
| 6,104,599 A * | 8/2000 | Ahiko et al. | 361/306.3 |
| 6,403,513 B1 * | 6/2002 | Sato et al. | 501/137 |
| 6,404,616 B2 | 6/2002 | Mizuno | |
| 6,411,495 B2 * | 6/2002 | Wada et al. | 361/321.4 |
| 6,645,897 B2 * | 11/2003 | Nakamura et al. | 501/137 |
| 6,853,536 B2 * | 2/2005 | Nakamura et al. | 361/321.4 |
| 7,061,748 B2 * | 6/2006 | Ito et al. | 361/321.4 |
| 7,199,996 B2 * | 4/2007 | Togashi et al. | 361/303 |
| 7,273,825 B2 | 9/2007 | Muto et al. | |
| 7,626,803 B2 | 12/2009 | Okamatsu et al. | |
| 7,742,278 B2 * | 6/2010 | Takeda | 361/321.2 |

FOREIGN PATENT DOCUMENTS

| | | |
|---|---|---|
| JP | 2001-028207 A | 1/2001 |
| JP | 2004-063119 A | 2/2004 |
| JP | 2005-136046 A | 5/2005 |
| JP | 2005-277178 A | 10/2005 |
| JP | 2007-173714 A | 7/2007 |
| JP | 2007-201278 A | 8/2007 |
| JP | 2007-288154 A | 11/2007 |
| JP | 2008-066600 A | 3/2008 |
| JP | 2008-084914 A | 4/2008 |

OTHER PUBLICATIONS

Written Opinion of the International Searching Authority, mailed Oct. 20, 2009.

* cited by examiner

*Primary Examiner* — Nguyen T Ha

(74) *Attorney, Agent, or Firm* — Dickstein Shapiro LLP

(57) ABSTRACT

Better high-temperature load characteristics are obtained in a laminated ceramic capacitor including a dielectric ceramic layer with a thickness of 1 μm or less. The laminated ceramic capacitor includes a plurality of stacked dielectric ceramic layers, a plurality of internal electrode layers, each disposed between dielectric ceramic layers, and external electrodes that are electrically connected to internal electrode layers. In this laminated ceramic capacitor, when the thickness of each dielectric ceramic layer is denoted by tc and the thickness of each internal electrode layer is denoted by te, tc is 1 μm or less, and tc/te is equal to or less than 1.

20 Claims, 1 Drawing Sheet

LAMINATED CERAMIC CAPACITOR

This is a continuation of application Serial No. PCT/JP2009/003460, filed Jul. 23, 2009, the contents of which are incorporated herein by reference.

TECHNICAL FIELD

The present invention generally relates to a laminated ceramic capacitor, and more particularly, relates to a laminated ceramic capacitor of the thin-layer type including a dielectric ceramic layer with a thickness of 1 µm or less.

BACKGROUND ART

Laminated ceramic capacitors, a major application of the present invention, are commonly produced as follows.

First, ceramic green sheets containing a dielectric ceramic raw material are prepared which have, on their surfaces, a conductive material provided in a desired pattern to serve as an internal electrode layer.

Next, multiple ceramic green sheets including the ceramic green sheets to which the conductive material is provided are stacked and subjected to thermocompression bonding, thereby producing an integrated raw laminate.

Next, a sintered laminate is obtained by firing the raw laminate. Inside this laminate, internal electrode layers are formed which are composed of the conductive material described above.

Then, external electrodes are formed on the outer surface of the laminate so as to be electrically connected to specific ones of the internal electrode layers. The external electrodes are formed, for example, by providing a conductive paste containing conductive metal powder and glass frit onto the outer surface of the laminate and firing the conductive paste. In this way, a laminated ceramic capacitor is completed.

In recent years, with miniaturization and higher performance devices, a reduction in size and an increase in capacitance have been also required for laminated ceramic capacitors. For this purpose, it is effective to reduce the thickness of the dielectric ceramic layer. Japanese Patent Application Laid-Open No. 2005-136046 (hereinafter, referred to as Patent Document 1) discloses a laminated ceramic capacitor of the thin-layer type including a dielectric ceramic layer with a thickness of 2 µm or less.

PRIOR ART DOCUMENT

Patent Document

Patent Document 1: Japanese Patent Application Laid-Open No. 2005-136046

DISCLOSURE OF THE INVENTION

Problem to be Solved by the Invention

Further reductions in size and increase in capacitance have been required for laminated ceramic capacitors. However, the laminated ceramic capacitor described in Patent Document 1 has a problem that the lifetime characteristics are degraded under high-temperature load conditions to increase the percent defectives in a high-temperature load test when the thickness of the dielectric ceramic layer is 1 µm or less.

Therefore, in view of this problem, an object of the present invention is to obtain better high-temperature load characteristics in a laminated ceramic capacitor including dielectric ceramic layers with a thickness of 1 µm or less.

Means for Solving the Problem

The laminated ceramic capacitor of the present invention is a laminated ceramic capacitor including a plurality of stacked dielectric ceramic layers; a plurality of internal electrode layers, each disposed between dielectric ceramic layers; and external electrodes electrically connected to the plurality of internal electrode layers, wherein when the thickness of each dielectric ceramic layer is denoted by tc and the thickness of each internal electrode layer is denoted by te, tc is 1 µm or less, and tc/te≦1 is satisfied.

In the laminated ceramic capacitor of the present invention, it is preferable that a dielectric ceramic constituting the dielectric ceramic layers has a composition containing a barium titanate based compound as its main constituent and containing vanadium as an accessory constituent.

In the laminated ceramic capacitor of the present invention, it is preferable that the content of the vanadium with respect to 100 parts by mol of the main constituent is 0.02 parts by mol or more and 0.20 parts by mol or less.

In the laminated ceramic capacitor of the present invention, it is preferable that a metal component constituting the internal electrode layers contains nickel as its main constituent.

Effect of the Invention

According to the present invention, the thickness of the internal electrode layer is equal to or greater than the thickness of the dielectric ceramic layer, and the compressive stress given by the internal electrode layers to the dielectric ceramic layers thus has a greater effect. Therefore, grain growth of ceramic grains can be moderately suppressed during the firing step. As a result, the ceramic in the fired dielectric ceramic layers is composed of fine grains with a sharp grain size distribution, and the insulating performance is thus less likely to be degraded even under high-temperature load conditions. This improves the high-temperature load characteristics of the laminated ceramic capacitor including the dielectric ceramic layer with a thickness of 1 µm or less.

In addition, when the composition of the dielectric ceramic layers in the present invention, contains a barium titanate based compound as its main constituent, and contains vanadium as an accessory component, the grains in the fired ceramic layers have a further sharper grain size distribution, and the number of defectives can also be thus reduced under the more severe high-temperature load conditions. When the content of vanadium is 0.02 parts by mol or more and 0.20 parts by mol or less with respect to 100 parts by mol of the main constituent, this advantageous effect is more pronounced.

BEST MODE FOR CARRYING OUT THE INVENTION

Figure 1:
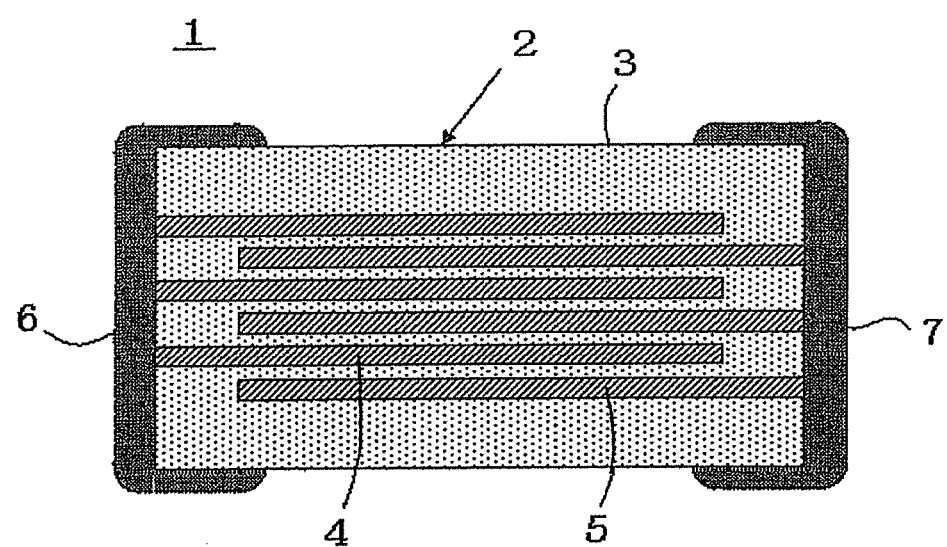
FIG. 1 is a cross-sectional view schematically illustrating a laminated ceramic capacitor according to an embodiment of the present invention.

First, a laminated ceramic capacitor according to the present invention will be described with reference to an example of FIG. 1.

As shown in FIG. 1, a laminated ceramic capacitor 1 includes a ceramic laminate 2 in the shape of a substantially rectangular parallelepiped. The ceramic laminate 2 includes a plurality of stacked dielectric ceramic layers 3, and a plurality of internal electrode layers 4 and 5 each formed along an interface between the plurality of dielectric ceramic layers 3. The internal electrode layers 4 and 5 are formed so as to reach the outer surface of the ceramic laminate 2. The internal electrode layers 4 are drawn to one end surface (the left end surface in FIG. 1) of the ceramic laminate 2. The internal electrode layers 5 are drawn to the other end surface (the right end surface in FIG. 1) of the ceramic laminate 2. The thus formed internal electrode layers 4 and internal electrode layers 5 are alternately arranged inside the ceramic laminate 2 so that capacitance can be acquired with the dielectric ceramic layers 3 interposed therebetween.

The conductive material for the internal electrode layers 4 and 5 is preferably a low-cost nickel or nickel alloy.

In order to extract the capacitance described above, external electrodes 6 and 7 are respectively formed on the end surfaces of the outer surface of the ceramic laminate 2 so as to be electrically connected to specific ones of the internal electrode layers 4 and 5. As a conductive material contained in the external electrodes 6 and 7, the same conductive material can be used as in the case of the internal electrode layers 4 and 5, and further, copper, silver, palladium, a silver-palladium alloy, etc. can be used. The external electrodes 6 and 7 are formed by providing a conductive paste obtained through the addition of a glass frit to the metal powder and firing the conductive paste.

The thickness tc of the dielectric ceramic layer 3 in the present invention refers to an average thickness per dielectric ceramic layer 3 between adjacent internal electrode layers. The dielectric ceramic layers 3 as protective layer sections, which are present at the surface layer sections of the ceramic laminate 2 and not sandwiched between the internal electrode layers 4 and 5, are not used to obtain the thickness tc in the present invention. In addition, the thickness to of each of the internal electrode layers 4 and 5 in the present invention refers to the average thickness of each internal electrode contributing to the formation of the capacitance.

The effect in the laminated ceramic capacitor according to the present invention is produced when the thickness tc is 1 μm or less. Thus, the laminated ceramic capacitor according to the present invention is directed to cases where the thickness tc is 1 μm or less. When tc/te≦1, the effect of improvement in high-temperature load characteristics is found for the laminated ceramic capacitor.

While the composition of the dielectric ceramic layers 3 according to the present invention is not particularly limited as long as the capacitance can be sufficiently formed, the main constituent of the composition is preferably a barium titanate based compound. The barium titanate based compound herein refers to a perovskite-type compound represented by the general formula $ABO_3$ in which A contains at least one selected from the group of elements consisting of Ba, Ca, and Sr, and inevitably contains Ba, whereas B contains at least one selected from the group of elements consisting of Ti, Zr, and Hf, and inevitably contains Ti. In particular, the perovskite-type compound represented by the general formula $ABO_3$ is preferably $BaTiO_3$, and the substitution with the other constituents is preferably 15 mol % or less in total to obtain high dielectric constant and high reliability. If necessary, the perovskite-type compound contains accessory constituents such as rare-earth elements, Mg, and Mn.

Furthermore, when the dielectric ceramic layers 3 in the laminated ceramic capacitor according to the present invention contain vanadium (V) as an accessory constituent, the high-temperature load characteristics are found to be further improved. When the V content with respect to 100 parts by mol of the main constituent falls within 0.02 to 0.20 parts by mol, the improvement effect described above becomes more pronounced.

The element V may be present as a solid solution in grains constituting the main constituent, or may be present as an oxide at crystal grain boundaries. In either case, an appropriate amount of V component effectively increases the compressive stress given by the internal electrode layers to the dielectric ceramic layers, and thus acts to further sharpen the grain size distribution for sintered grains.

EXAMPLES

Experimental Example 1

This experimental example was carried out to examine the effects of tc/te on various characteristics in laminated ceramic capacitors with the composition of the dielectric ceramic layers fixed to specific composition and with varying values of tc and te.

A $BaCO_3$ powder and a $TiO_2$ powder were prepared. These powders were weighed to provide the composition of $BaTiO_3$, mixed in a ball mill for 24 hours, dried, and then calcined at a temperature of 1100° C. to obtain a $BaTiO_3$ powder with an average grain diameter of 0.12 μm.

To this $BaTiO_3$ powder, $MgCO_3$, $MnCO_3$, $Dy_2O_3$, and $SiO_2$ powders were added so that the molar ratio of ($BaTiO_3$:Dy:Mg:Mn:Si) was 100:1.0:1.0:0.3:1.0, mixed in a ball mill for 5 hours, dried, and ground to obtain a ceramic raw material powder.

To this ceramic raw material powder, a polyvinyl butyral based binder and ethanol were added, and subjected to wet mixing in a ball mill for 24 hours to produce a ceramic slurry. This ceramic slurry was subjected to sheet forming by a die coater to obtain green sheets with three different predetermined thicknesses. Next, a conductive paste containing Ni as its main constituent was applied by screen printing onto the ceramic green sheets, thereby forming conductive paste layers for constituting internal electrode layers so as to have a predetermined thickness.

In addition, as a countermeasure against the difference in level between the regions with and without an internal electrode layer in the planar direction, a paste containing the ceramic raw material powder was applied to the region with no conductive paste formed, so as to have the same thickness as the thickness of the conductive paste.

Next, the multiple ceramic green sheets with the conductive paste layers formed were stacked so that the sides with the conductive pastes exposed to the outer surface were alternately arranged, thereby providing a laminate. This laminate was heated to a temperature of 300° C. in a $N_2$ gas atmosphere to burn off the binder, and then fired at a temperature of 1150° C. for 2 hours in a reducing atmosphere composed of a $H_2$—$N_2$—$H_2O$ gas with an oxygen partial pressure of $10^{-10}$ MPa, thereby providing a ceramic laminate.

A Cu paste containing $B_2O_3$—$Li_2O$—$SiO_2$—BaO glass frit was applied onto the both end surfaces of the fired ceramic laminate, and fired at a temperature of 800° C. in a $N_2$ gas atmosphere to form external electrodes electrically connected to the internal electrode layers.

The respective samples of sample numbers 1 to 9 of the laminated ceramic capacitors obtained as described above had outer dimensions of a width of 0.8 mm and a length of 1.6 mm. Further, the total number of dielectric ceramic layers contributing to the formation of the capacitance was 400, and the effective area of the internal electrode layer opposed per dielectric ceramic layer was 0.9 mm². In addition, the values of tc, te, and tc/te are shown in Table 1 for each of the samples of sample numbers 1 to 9.

The laminated ceramic capacitors obtained as described above were evaluated for their dielectric constant at room temperature, temperature characteristic of the capacitance, and high-temperature load characteristic. In addition, in order to check the degree of grain growth, the average grain diameter was measured after the firing. Followings are the detailed conditions for the evaluations and measurements.

Dielectric Constant: the temperature was 25° C., and the applied voltage was 0.5 Vrms at 1 kHz.

Temperature Characteristic of Capacitance: the rate of change at a temperature of 85° C. for the capacitance at the applied voltage is shown with the capacitance at a temperature of 25° C. as a standard.

High-Temperature Load Characteristic: a voltage was applied at a temperature of 85° C. so as to provide an electric field intensity of 4 kV/mm, and the temporal change of the insulation resistance was measured. The number of samples was 100 for each sample number. The samples with their insulation resistance values decreased to 100 kΩ or less before a lapse of 2000 hours were determined as defectives, and the number of defectives was counted.

Average Grain Diameter: the fired samples were fractured, and subjected to a heat treatment at a temperature of 1000° C., and the fracture cross sections were then observed by a scanning electron microscope (SEM). The observed images were used to carry out image analyses for 300 grains, and with Heywood diameter as a grain diameter, the average value was obtained for the grain diameters of the 300 grains.

The results of the dielectric constant, the temperature characteristic of capacitance, the high-temperature load characteristic, and the average grain diameter are shown in Table 1 for each of samples of sample numbers 1 to 9.

TABLE 1

| Sample Number | tc (μm) | te (μm) | tc/te | Average Grain Diameter (μm) | Dielectric Constant | Temperature Characteristics (%) | The Number of Defectives in High Temperature Load Test |
|---|---|---|---|---|---|---|---|
| 1 | 1.0 | 0.5 | 2.00 | 0.31 | 1700 | −15.5 | 1 |
| 2 | 1.0 | 1.0 | 1.00 | 0.16 | 1800 | −15.7 | 0 |
| 3 | 1.0 | 1.5 | 0.67 | 0.15 | 1700 | −15.3 | 0 |
| 4 | 0.5 | 0.3 | 1.67 | 0.27 | 2100 | −13.7 | 4 |
| 5 | 0.5 | 0.5 | 1.00 | 0.16 | 2000 | −14.0 | 0 |
| 6 | 0.5 | 0.7 | 0.71 | 0.14 | 2200 | −13.9 | 0 |
| 7 | 0.3 | 0.2 | 1.50 | 0.25 | 2100 | −14.2 | 5 |
| 8 | 0.3 | 0.3 | 1.00 | 0.15 | 2200 | −14.3 | 0 |
| 9 | 0.3 | 0.6 | 0.50 | 0.13 | 2200 | −14.1 | 0 |

From the results in Table 1, it has been found that the number of defectives in the high-temperature load test is zero in the tc range of 1 μm or less for the samples of sample numbers 2, 3, 5, 6, 8, and 9 with tc/te of 1 or less, which means that the samples exhibit improved high-temperature load characteristics. In addition, it has been found that grain growth due to firing is suppressed in these samples.

Experimental Example 2

This experimental example was carried out for laminated ceramic capacitors with varying compositions of dielectric ceramic layers and varying values of tc and te value to examine the effects of the variations on high-temperature load characteristics.

First, a $BaTiO_3$ powder was obtained in the same manner as in Experimental Example 1.

To this $BaTiO_3$ powder, $MgCO_3$, $MnCO_3$, $Dy_2O_3$, $SiO_2$, $V_2O_5$ powders were added so that the molar ratio of ($BaTiO_3$:Dy:Mg:Mn:Si:V) was 100:1.0:1.0:0.3:1.0:x, mixed in a ball mill for 5 hours, dried, and ground to obtain a ceramic raw material powder. The value of x is as shown for sample numbers 101 to 130 in Table 2.

The respective ceramic raw material powders of the samples of sample numbers 101 to 130 were used to obtain samples of laminated ceramic capacitors in the same manner as in Experimental Example 1, with the various values for tc, te, and tc/te in sample numbers 101 to 130 shown in Table 2.

The laminated ceramic capacitors obtained as described above were evaluated for the high-temperature load characteristics in the same manner as in Experimental Example 1, provided that the conditions for evaluation were changed from Experimental Example 1 only in that the electric field intensity for the load was increased to 6.3 kV/mm. The results are shown in Table 2.

TABLE 2

| Sample Number | x | tc (μm) | te (μm) | tc/te | The Number of Defectives in High Temperature Load Test |
|---|---|---|---|---|---|
| 101 | 0 | 1.0 | 1.0 | 1.00 | 3 |
| 102 | 0.02 | 1.0 | 1.0 | 1.00 | 0 |
| 103 | 0.05 | 1.0 | 1.0 | 1.00 | 0 |
| 104 | 0.10 | 1.0 | 1.0 | 1.00 | 0 |
| 105 | 0.20 | 1.0 | 1.0 | 1.00 | 0 |
| 106 | 0 | 1.0 | 1.5 | 0.67 | 1 |
| 107 | 0.02 | 1.0 | 1.5 | 0.67 | 0 |
| 108 | 0.05 | 1.0 | 1.5 | 0.67 | 0 |
| 109 | 0.10 | 1.0 | 1.5 | 0.67 | 0 |
| 110 | 0.20 | 1.0 | 1.5 | 0.67 | 0 |
| 111 | 0 | 0.5 | 0.5 | 1.00 | 2 |
| 112 | 0.02 | 0.5 | 0.5 | 1.00 | 0 |
| 113 | 0.05 | 0.5 | 0.5 | 1.00 | 0 |
| 114 | 0.10 | 0.5 | 0.5 | 1.00 | 0 |
| 115 | 0.20 | 0.5 | 0.5 | 1.00 | 0 |

TABLE 2-continued

| Sample Number | x | tc (μm) | te (μm) | tc/te | The Number of Defectives in High Temperature Load Test |
|---|---|---|---|---|---|
| 116 | 0 | 0.5 | 0.7 | 0.71 | 1 |
| 117 | 0.02 | 0.5 | 0.7 | 0.71 | 0 |
| 118 | 0.05 | 0.5 | 0.7 | 0.71 | 0 |
| 119 | 0.10 | 0.5 | 0.7 | 0.71 | 0 |
| 120 | 0.20 | 0.5 | 0.7 | 0.71 | 0 |
| 121 | 0 | 0.3 | 0.3 | 1.00 | 4 |
| 122 | 0.02 | 0.3 | 0.3 | 1.00 | 0 |
| 123 | 0.05 | 0.3 | 0.3 | 1.00 | 0 |
| 124 | 0.10 | 0.3 | 0.3 | 1.00 | 0 |
| 125 | 0.20 | 0.3 | 0.3 | 1.00 | 0 |
| 126 | 0 | 0.3 | 0.6 | 0.50 | 1 |
| 127 | 0.02 | 0.3 | 0.6 | 0.50 | 0 |
| 128 | 0.05 | 0.3 | 0.6 | 0.50 | 0 |
| 129 | 0.10 | 0.3 | 0.6 | 0.50 | 0 |
| 130 | 0.20 | 0.3 | 0.6 | 0.50 | 0 |

As can be seen from the results in Table 2, the samples of sample numbers 101, 106, 111, 116, 121, and 126 had defectives under the high load condition of 6.3 kV/mm, although the samples satisfy tc/te≦1. However, the samples of sample numbers 102 to 105, 107 to 110, 112 to 115, 117 to 120, 122 to 125, and 127 to 130 had no defectives even under the high load condition of 6.3 kV/mm.

The embodiment and examples disclosed herein are to be considered merely for the purposes of illustration and not limitation in all respects. The scope of the present invention is defined not by the embodiment or examples described above but by the claims below, and is intended to encompass all modifications and variations within the equivalent meaning and scope with respect to the claims.

INDUSTRIAL APPLICABILITY

The laminated ceramic capacitor including the dielectric ceramic layers with a thickness of 1 μm or less has high-temperature load characteristics improved, thus making it possible to deal with reduction in size and increase in capacitance for laminated ceramic capacitors.

DESCRIPTION OF REFERENCE SYMBOLS 1 laminated ceramic capacitor
2 ceramic laminate
3 dielectric ceramic layer
4, 5 internal electrode layer
6, 7 external electrode

The invention claimed is:

1. A laminated ceramic capacitor comprising:
a plurality of stacked dielectric ceramic layers;
a plurality of internal electrode layers, each of which is disposed between adjacent dielectric ceramic layers; and
a pair of external electrodes electrically connected to different ones of the plurality of internal electrode layers, wherein when the average thickness of each dielectric ceramic layer sandwiched between a pair of internal electrodes is tc, the thickness of each internal electrode layer is te, tc is 1 μm or less, and tc/te is equal to or less than 1.

2. The laminated ceramic capacitor according to claim 1, wherein the dielectric ceramic in the dielectric ceramic layers is a barium titanate based compound and contains vanadium as an accessory constituent.

3. The laminated ceramic capacitor according to claim 2, wherein the content of the vanadium with respect to 100 parts by mol of the main constituent is 0.02 to 0.20 parts by mol.

4. The laminated ceramic capacitor according to claim 3, wherein the internal electrode layers comprise nickel.

5. The laminated ceramic capacitor according to claim 4, wherein the barium titanate based compound is of the formula $ABO_3$ where A is Ba, and up to 15 mol % of each of Ca and Sr, and B is Ti, and up to 15 mol % of each of Zr and Hf.

6. The laminated ceramic capacitor according to claim 5, wherein the barium titanate based compound is $BaTiO_3$.

7. The laminated ceramic capacitor according to claim 6, wherein tc is less than 1 μm, and tc/te is less than 1.

8. The laminated ceramic capacitor according to claim 2, wherein the internal electrode layers comprise nickel.

9. The laminated ceramic capacitor according to claim 8, wherein the barium titanate based compound is of the formula $ABO_3$ where A is Ba, and up to 15 mol % of each of Ca and Sr, and B is Ti, and up to 15 mol % of each of Zr and Hf.

10. The laminated ceramic capacitor according to claim 9, wherein the barium titanate based compound is $BaTiO_3$.

11. The laminated ceramic capacitor according to claim 10, wherein tc is less than 1 μm, and tc/te is less than 1.

12. The laminated ceramic capacitor according to claim 1, wherein the internal electrode layers comprise nickel.

13. The laminated ceramic capacitor according to claim 12, wherein the barium titanate based compound is of the formula $ABO_3$ where A is Ba, and up to 15 mol % of each of Ca and Sr, and B is Ti, and up to 15 mol % of each of Zr and Hf.

14. The laminated ceramic capacitor according to claim 13, wherein the barium titanate based compound is $BaTiO_3$.

15. The laminated ceramic capacitor according to claim 14, wherein tc is less than 1 μm, and tc/te is less than 1.

16. The laminated ceramic capacitor according to claim 1, wherein the barium titanate based compound is of the formula $ABO_3$ where A is Ba, and up to 15 mol % of each of Ca and Sr, and B is Ti, and up to 15 mol % of each of Zr and Hf.

17. The laminated ceramic capacitor according to claim 16, wherein the barium titanate based compound is $BaTiO_3$.

18. The laminated ceramic capacitor according to claim 17, wherein tc is less than 1 μm, and tc/te is less than 1.

19. The laminated ceramic capacitor according to claim 1, wherein tc is less than 1 μm, and tc/te is less than 1.

20. The laminated ceramic capacitor according to claim 1, wherein tc is 0.5 μm or less.

* * * * *